Aug. 5, 1969  P. ECKSTEIN  3,459,309
COOLING WATER PURIFICATION APPARATUS
Filed Sept. 13, 1965  2 Sheets-Sheet 2
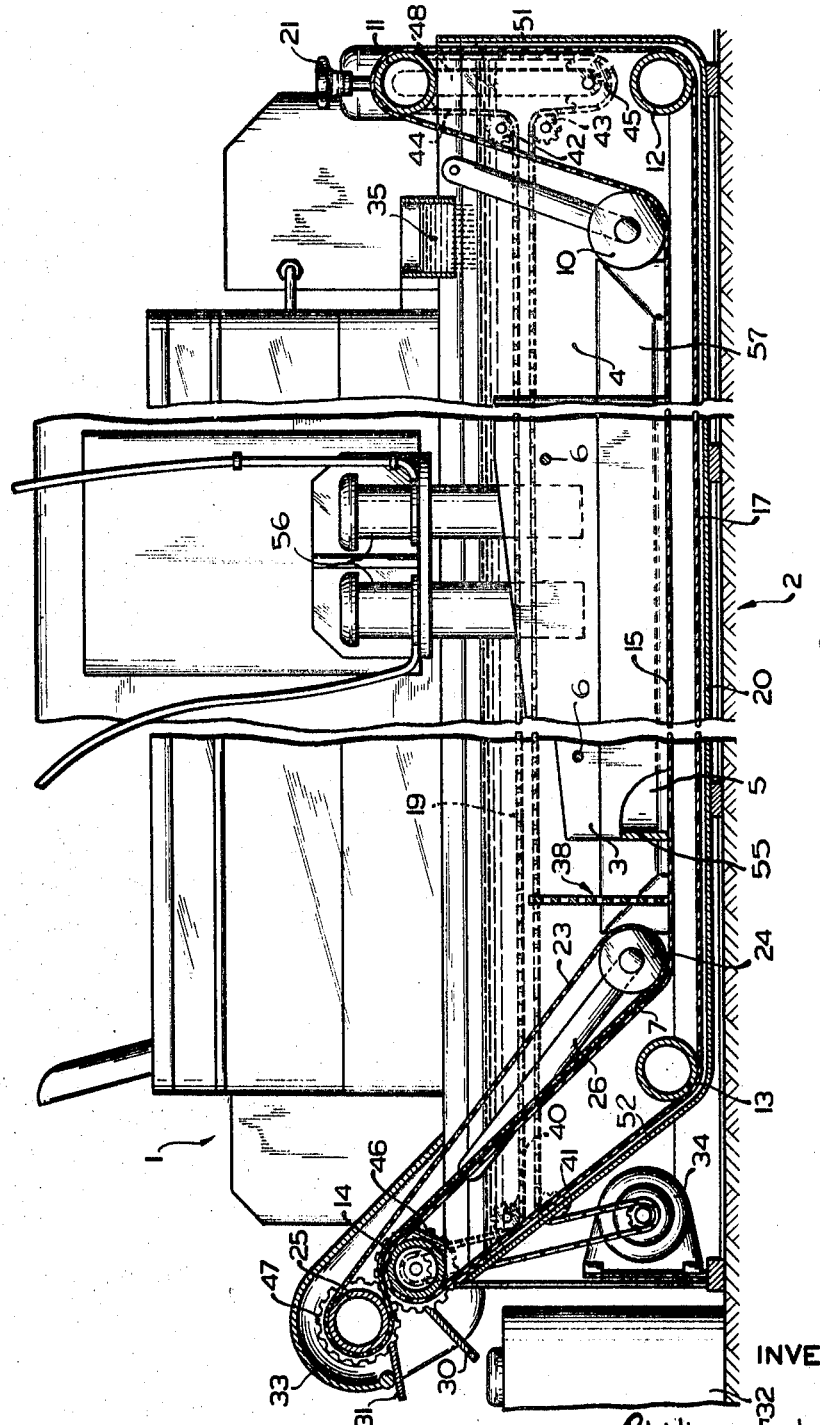
INVENTOR
Philipp Eckstein
Attorneys
Browne, Schuyler & Beveridge United States Patent Office 3,459,309
Patented Aug. 5, 1969

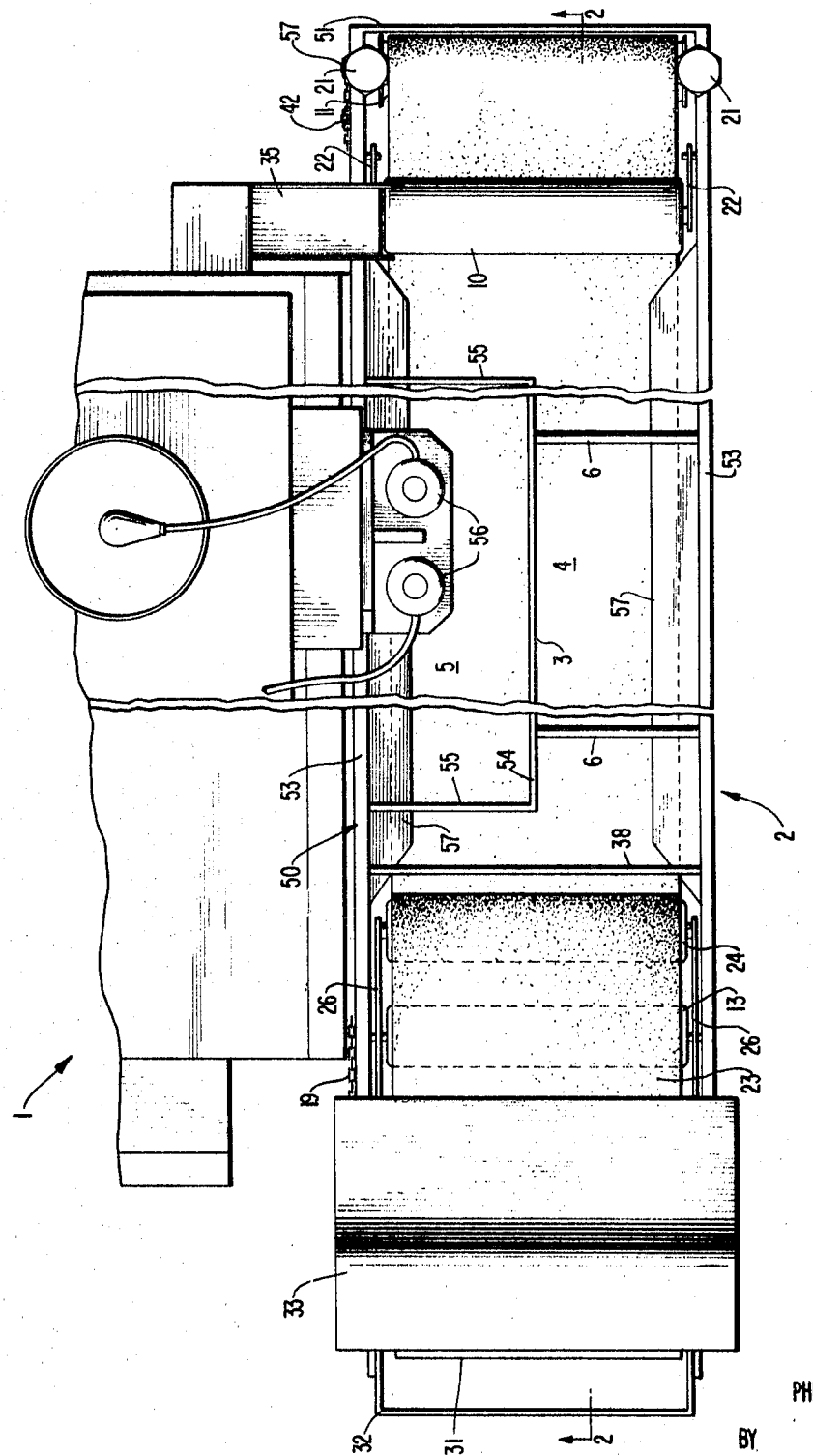

3,459,309
COOLING WATER PURIFICATION APPARATUS
Philipp Eckstein, Darmstadt, Germany, assignor to Gustav Gockel Maschinenfabrik GmbH, Frankfurt am Main, Germany
Filed Sept. 13, 1965, Ser. No. 486,798
Claims priority, application Germany, Sept. 19, 1964, G 41,561
Int. Cl. B01d 33/04
U.S. Cl. 210—320                                6 Claims

ABSTRACT OF THE DISCLOSURE

A surface grinder cooling water purification plant including an elongated settling through divided into an infeed and a settling chamber, with the conveying run of an endless belt forming the floor for both chambers so that impurities settling from water in the trough will be deposited on the belt. The conveying run of the belt includes an inclined segment leading from the trough to convey settled impurities therefrom. The walls of the discharge chamber act as a baffle, with the water in the trough flowing over the top of the walls, so that water near the bottom of the infeed chamber, which contains the maximum impurities, is not permitted to flow into the discharge chamber nor is it disturbed by the pumping of water from the discharge chamber.

---

The present invention relates to a cooling water-purification plant for a surface grinder, and more particularly to an improved purification plant of the type employing a settling tank with a conveyer belt moving therethrough for removing impurities from a surface grinder cooling water system.

It is known in the art to provide a cooling water system purification plant for a surface grinder including an elongated cooling water trough, with the trough being subdivided by a transverse wall into two chambers. The cooling water, containing impurities, and coming from the surface grinder, flows into the first chamber where the greater part of the impurities will settle to the bottom. From the first chamber, the cooling water flows across the inclined upper edge of the transverse wall into the second chamber where the remainder of the impurities are permitted to settle to the bottom. The cooling water, thus purified, is drawn off for recirculation through the surface grinder. To remove the impurities settling from the cooling water, an endless conveyer belt moves along the floor of the trough, in position for settling grinding impurities to be deposited thereon, through both of the chambers to the discharge end of the trough and then upwardly at an incline to convey the impurities over the top of the trough. To assure that the impurities remain on the conveyer on the inclined portion, a second counter-rotating belt is supported by two rollers in position to cooperate with the conveyer belt at the discharge end so that the impurities are caught between the two belts to be carried upwardly over the edge of the trough to be discharged into a waste receptacle.

In these prior art devices, the endless conveyer belt is normally guided from the discharge end of the trough outside and below the bottom surface of the trough to the inflow end where it re-enters the water. The endless belt is guided across appropriate positioning and tensioning rollers, one of which is driven to drive the belt around its endless path. The counter-rotating belt at the discharge end of the trough is driven through frictional contact with the main conveyer belt.

These prior art devices have not been entirely satisfactory in that the return run of the conveying belt extending outside of and beneath the settling trough made both assembly and repair of the apparatus difficult and time consuming operations. Further, the return run extending beneath the trough required supporting rollers and a drip pan to collect water running off the wet conveyer belt. Also, the conventional single roll drive for the conveying belt, particularly if the cooling water has an oily or dirty consistency, has resulted in much belt slippage and irregular driving of the belt.

Accordingly, it is an object of this invention to provide an improved cooling water purification plant for a surface grinder cooling water system.

Another object is to provide such a water purification plant employing a settling trough with an endless conveying belt moving therethrough for removing the impurities settling therein.

Another object is to provide such a water purification plant in which both the conveying and return runs of the endless conveyer belt pass through the cooling water within the settling tank.

Another object is to provide such a water purification plant in which a plurality of the conveyer belt supporting rollers are driven.

Another object is to provide such a water purification plant including a driven conveyer belt tensioning roll.

In the attainment of the foregoing and other objects an important feature of my invention resides in mounting the conveyer belt for movement about an endless path over suitable rollers with the upper conveying run of the belt being spaced above the bottom surface of the settling tank. The return non-conveying run of the belt is directed over suitable idler rolls and extends along the bottom surface of the settling trough beneath the upper conveying run of the belt. The conveyer belt is driven by a chain extending around a roller at each end of the trough to thereby assure an even, non-slipping driving of the belt. One of the driven rollers is movably mounted in a compensating head to permit the belt tension to be adjusted without influencing its driving agent. This has been accomplished by guiding the driving chain in a closed loop which runs around the driving sprocket of the tension roller and around an idling sprocket located a fixed distance from the tension roller in such a manner that when the position of the tension roller is changed, the position of the closed chain loop will also be changed but its size will remain the same.

Further objects and advantages of the invention will become apparent from the following description of a preferred embodiment illustrated in the accompanying drawings, in which:

FIG. 1 is a top plan view of a water purification plant embodying the invention; and FIG. 2 is a sectional view, taken on line 2—2 of FIG. 1, with certain parts broken away to more clearly show other parts.

Referring now to the drawings in detail, a grinding machine, indicated generally by the reference numberal 1, is shown in use with a cooling water purification installation according to the present invention. The water purification apparatus is indicated generally by the reference numeral 2 and includes an elongated settling trough 50 defined by a vertical end wall 51, an inclined end wall 52, and opposed vertical side walls 53. The settling trough 50 has been subdivided into an infeed chamber 4 and a discharge chamber 5 by a longitudinal wall 3 having an inclined upper edge 54 and joined at its ends by transverse walls 55 to one side wall 53 of the trough. The height of the wall 3 gradually decreases from a maximum at the end thereof closest the end wall 51 of the trough to its minimum height at the end closest the end wall 51 of the trough to its minimum height at the end closest the end wall 52 of the trough. Tie rods, or bolts 6 extend between one wall 53 and the longitudinal wall 3 to lend support thereto at points intermediate the transverse walls 55.

An endless conveyer belt 7 runs along and forms the floor of both chambers through substantially the full length of the trough. The conveyer belt is engaged and is deflected on the inflow end by the rollers 10, 11 and 12 and at the discharge end by the rollers 13 and 14. The upper conveying run 15 and the lower return run 17 of belt 7 both move within the water trough above its floor 20. The upper run 15 functions as a floor for collecting and removing the sedimentary materials from both chambers. The water, coming from the grinding machine and carrying impurities from the grinding operation will reach the inflow chamber 4 via the inlet 35 where initial settling takes place. From chamber 4, the water will gradually flow over wall 3 to enter the drawing off chamber 5 in which further suspended substances will settle. From chamber 5 the water is drawn off for recirculation and use by suitable pump means 56. Also, baffles 57 may be provided in the bottom of the trough, if desired, to assure that settling particles are deposited on the moving belt.

The upper conveying run 15 of belt 7 moves to the left as seen in the drawing and, in so doing, it transports any grinding particles that have settled on it to the discharge end of the cooling water trough where the counter-rotating belt 23, guided around rollers 24 and 25, overlays and engages the main conveying belt. In order to impart limited flexibility to the discharge end of the apparatus, the roller 24 of the counter-rotating belt 23 is rotatably mounted on one end of the pivotally mounted arm 26. Further, a screen 38 is placed in front of the discharge installation. Impurities carried upward at an incline by the two cooperating conveyer belts from the floor of the trough are taken off the conveying belts with the help of wiper plates 30 and 31, with the impurities dropping into a suitable waste receptacle 32. The returning run 17 of the endless conveyer belt runs within the cooling water trough 4 between its floor wall 20 and the forward moving run 15. Since the conveyer belt moves almost completely within the cooling water trough, additional measures for the removal of water dripping off the wet conveyer belt are unnecessary.

The apparatus is driven by a suitable motor 34 via an endless chain 19 extending around sprocket 46 on deflection roller 14 and sprocket 57 on the tension roller 11 of the main conveying belt. The chain 19 is guided along one side of the trough by two idler sprockets 40 and 41 mounted on wall 53 near the end wall 52 to the opposite end of the trough where it is deflected through two similar idler sprockets 42 and 43. From sprockets 42, 43, chain 19 continues in a closed loop 44 around a driving sprocket 57 on the tension roller 11 and another idler sprocket 45 supported at a fixed distance from the tension roller 11. In the case of an adjustment of the tension roller 11, with the help of the adjusting wheel 21, to vary the tension in the main conveyer belt, the idler sprocket 45 is shifted in the same measure as the tension roller 11 so that the loop 44 will change its position in a vertical direction but will maintain its fixed size.

In order to maintain a constant distance between the tension roller 11 and the idler sprocket 45, the axis of said sprocket 45 is rotatably supported on a spacing arm which, in turn, is fixedly connected to the mounting of roller 11 for movement therewith during adjustment of said roller upon actuation of adjusting wheel 21. The sprockets 42, 43 and 45 as well as the driving sprocket of the tension roller 11, together with the spacing arm 48, collectively represent a compensating head for the driving chain 19. The tension of the driving chain 19 will, therefore, remain constant independently of the adjustment of the tension roller 11.

In order to positively drive the counter-rotating belt rather than to permit it to be driven through frictional contact with the main conveyer belt, a gear 46 has been provided on the end of roller 14 in position to mesh with a gear 47 rotatably fixed on the deflection roll 25 of the counter-rotating belt 23 so that belt 23 is positively driven to move the same speed as the conveyer belt. The rollers 14 and 25, as well as the gears 46, 47 are covered with a protecting hood 33 to prevent any unintentional contact.

While I have disclosed a preferred embodiment of my invention, I wish it understood that I do not intend to be restricted solely thereto, but that I do intend to include all embodiments thereof which would be apparent to one skilled in the art and which come within the spirit and scope of my invention.

I claim:

1. A cooling water purification plant useful with a surface grinder comprising, an elongated settling trough through which the cooling water flows at a rate permitting settling of grinding impurities, wall means mounted within and dividing said trough into an infeed chamber and a discharge chamber, said wall means terminating below the top of said trough to permit water to flow over the top of said wall from said infeed chamber to said discharge chamber, a first conveyer belt mounted for movement around an endless path defined by a plurality of spaced rollers, said path including a conveying run extending within said trough in position for impurities settling from the cooling water in said infeed and said discharged chambers to be deposited thereon and a return run extending within said trough between the bottom wall thereof and said conveying run, a pair of guide rollers mounted within said trough one adjacent each end thereof between said conveying and said return runs for guiding said return run between said conveying run and the bottom wall of said trough, said conveying run including a substantially horizontal segment extending substantially parallel to and in vertically spaced relation with the bottom wall of said trough to form a floor for said infeed and said discharge chambers and an inclined segment extending to a point outside said trough, means for driving one of said spaced rollers to drive said first conveyer belt around said endless path to convey settled impurities from said infeed and discharge chambers of said trough, means rotating said drive roller, and a second endless conveyer belt overlying and engaging said inclined portion of said first conveying belt and moving therewith, said second conveying belt cooperating with said inclined portion to retain settled impurities thereon during movement up the inclined portion of said endless path.

2. The cooling water purification apparatus defined in claim 1 wherein a plurality of the rollers engaging said first conveyer belt are driven to positively drive said belt around said endless path, said apparatus further comprising adjustable means mounting one of said driven rollers for movement substantially perpendicular to its axis of rotation to adjust the tension in said first conveyer belt, and a driven roller engaging and driving said second conveyer belt at a linear rate corresponding to the linear rate of said first conveyer belt.

3. A cooling water purification apparatus useful with a surface grinder comprising an elongated settling trough, wall means mounted within and dividing said trough into an infeed chamber and a discharge chamber, said wall means terminating below the top of said trough to permit water in said trough to flow into said discharge chamber over the top of said wall means, a conveyer belt mounted for movement about an endless path including a conveying run and a return run, said conveying run extending within said trough and including a substantially horizontal segment moving in vertically spaced relation to the bottom wall of said trough, and forming a floor for said infeed and said discharge chambers and an inclined segment extending from one end of said horizontal segment to a point outside said trough, means guiding said return run of said conveyor belt within said trough between said bottom wall and said conveying run, roller means driving said conveyor belt to carry impurities settling from said infeed and said discharge chambers on said conveying run from said trough, a chain extending around a sprocket rotatably fixed on said drive roller, means driving said chain to drive said belt in said endless path, means mounting said drive roller for movement along a path substantially perpendicular to its axis of rotation, adjustable means for moving said roller along said path to vary the tension in said conveyor belt, and take-up means mounted for movement with said drive roller and engaging said drive chain to vary the effective length of said drive chain in accordance with the adjusted position of said drive roller.

4. The cooling water purification apparatus defined in claim 3 further comprising water inlet means near the end of said trough opposite said one end for discharging water into said infeed chamber, said wall means being of decreasing height from a maximum at the end of said discharge chamber farthest from said one end to a minimum at the end thereof closest said one end of said trough.

5. A cooling water purification apparatus useful with a surface grinder comprising, an elongated settling trough, wall means mounted within and dividing said trough into an infeed chamber and a discharge chamber, said wall means terminating below the top of said trough to permit water in said trough to flow over the top of said wall means from said infeed to said discharge chamber, said wall means being inclined along its top edge to provide a decreasing height from a maximum at one end to a minimum at its opposite end, a conveyer belt mounted for movement about an endless path including a conveying run and a return run, said conveying run extending within said trough and including a substantially horizontal segment moving in vertically spaced relation to the bottom wall of said trough and forming a floor for said infeed and said discharge chambers and an inclined portion extending upwardly therefrom, means cooperating with said inclined portion to retain settled solids thereon during movement of said belt along said inclined portion, a plurality of driven rollers each engaging and driving said conveyer belt to carry impurities settling on said conveying run from said trough, means guiding said return run of said conveyer belt within said trough between said bottom wall and said conveying run, and adjustable means mounting one of said driven rollers for movement in a direction substantially perpendicular to its axis of rotation for adjusting the tension in said conveyer belt.

6. In a conveyer mechanism having a belt driven around an endless path by a pair of drive rollers, a chain extending around a sprocket rotatably fixed on each of said drive rollers, means driving said chain to drive said belt in said endless path, a conveyer belt tensioning mechanism comprising, means mounting one of said drive rollers for transverse movement along a fixed path to vary the length of said endless path, adjustable means for moving said one drive roller along said fixed path to vary the tension in said conveyer belt, and take-up means mounted for movement with said one drive roller and engaging said drive chain to vary the effective length of said drive chain in accordance with the adjusted position of said drive roller, said take-up means including an elongated arm having one end mounted on said means mounting said one drive roller and extending in the direction of movement thereof, a first idler sprocket rotatably mounted on the end of said arm opposite said one end for movement therewith, and a pair of idler sprockets mounted for rotation about spaced axes intermediate the axes of said first sprocket and said roller, said chain extending over said pair of idler sprockets, said first idler sprocket and said sprocket on said drive chain in a closed loop path with said closed loop being movable upon movement of said one drive roller, whereby said one drive roller and the sprocket rotatably fixed thereon may be moved along said fixed path to vary the tension in said belt without varying the length of said chain.

References Cited

UNITED STATES PATENTS

| 1,915,733 | 6/1933 | Hand | 210—400 X |
| 2,652,928 | 9/1953 | Komline | 210—401 |
| 2,759,606 | 8/1956 | Nippert | 210—400 X |
| 3,087,620 | 4/1963 | Hirs | 210—387 X |
| 3,140,961 | 7/1964 | Kronlund | 210—400 X |
| 3,197,030 | 7/1965 | Black | 210—400 |
| 3,273,494 | 9/1966 | Cocchiarella | 210—386 X |

SAMIH N. ZAHARNA, Primary Examiner

U.S. Cl. X.R.

210—386, 400